United States Patent [19]

Saridakis

[11] 4,160,047
[45] Jul. 3, 1979

[54] POSITIVE NICKEL ELECTRODE FOR ALKALINE STORAGE BATTERIES AND PROCESS FOR ITS PRODUCTION

[75] Inventor: Nikolaus Saridakis, Brunswick, Fed. Rep. of Germany

[73] Assignee: Volkswagenwerk Aktiengesellschaft, Wolfsburg, Fed. Rep. of Germany

[21] Appl. No.: 919,829

[22] Filed: Jun. 28, 1978

[30] Foreign Application Priority Data

Jul. 9, 1977 [DE] Fed. Rep. of Germany ....... 2731064

[51] Int. Cl.$^2$ .............................................. B05D 5/12
[52] U.S. Cl. .................................. 427/115; 29/623.5; 427/126; 427/435
[58] Field of Search ............................ 29/623.1, 623.5; 429/223; 427/126, 115, 247, 435

[56] References Cited

U.S. PATENT DOCUMENTS 3,228,795  1/1966  Ackermann .......................... 427/126

Primary Examiner—Charles F. LeFevour
Attorney, Agent, or Firm—Brumbaugh, Graves, Donohue & Raymond

[57] ABSTRACT

A positive nickle electrode for alkaline storage batteries formed to contain aluminum hydroxide. A porous supporting grid of conducting material is immersed in an impregnating solution containing a nickel salt dissolved in a solvent and at least one aluminum salt in solution. The grid is subsequently immersed in an alkaline medium where the hydroxides are precipitated.

14 Claims, No Drawings

POSITIVE NICKEL ELECTRODE FOR ALKALINE STORAGE BATTERIES AND PROCESS FOR ITS PRODUCTION

BACKGROUND OF THE INVENTION

The present invention is an improved positive nickel electrode for alkaline storage batteries, and a process for producing the same.

The use of nickel electrodes as the positive electrode in an alkaline storage battery, and particularly in those used as principal drive batteries for powering electrical vehicles, is known. There are several common methods for preparing suitable positive nickel electrodes. One such method is a chemical process, in which the electrode is formed through a repeated impregnation of a porous supporting grid formed of a conductor material, which preferably also contains nickel, with a solution containing nickel salts and a certain quantity of cobalt salt, followed by immersion in an alkaline medium for precipitating the hydroxides. Another common method is an electro-chemical preparation of positive nickel electrodes. The presently known methods, however, are relatively time-consuming and expensive. In addition, electrodes formed by these processes tend to have relatively low ampere-hour capacities. The electrochemical method of preparation, furthermore, consumes a large amount of energy in its production.

Hence it would be desirable to provide a positive nickel electrode and a process for producing the same in which an electrode having a high ampere-hour capacity and a long service life can be produced more rapidly and without a large expenditure of energy.

SUMMARY OF THE INVENTION

The present invention is a novel positive nickel electrode which is both easier to fabricate than, and functionally superior to, positive nickel electrodes known in the art. As in known methods, a porous supporting grid made up of a conducting material is impregnated with a solution containing nickel salts, and then immersed in an alkaline medium in order to precipitate the hydroxides. In the present invention, however, the impregnating solution contains at least one aluminum salt in solution. Through the addition of aluminum salt, the method of preparation is simplified and shortened, and at the same time produces a positive nickel electrode with improved operational characteristics.

DETAILED DESCRIPTION OF THE INVENTION

In preparing a positive nickel electrode according to the invention, a porous supporting grid of conducting material is impregnated in a nickel salt solution containing aluminum salts. The solution of aluminum salt is preferably an aluminum chloride and/or aluminum nitrate in distilled water, the solution having a density of about 1.2 g/cm$^3$. The aluminum salt solution is added in an amount up to about 1 cm$^3$, preferably 0.35 to 0.70 cm$^3$, per 1 g of nickel salt. As opposed to known prior art chemical methods requiring 4 to 8 impregnations of the grid, in the present method 1 or 2 five minute impregnations are sufficient, and the positive nickel electrode prepared in this manner exhibits a very high amperehour capacity associated with a good voltage setting and a discharge of relatively short duration. Furthermore, the number of cycles (i.e., the number of charges and discharges) attainable with these electrodes is extremely high, substantially over 1000, without any change in the electrical properties of the electrodes.

It has been found that the process is more effective if the solvent used for the impregnating solution is one having a low surface tension, preferably acetone and/or ethanol. However, methanol or acetaldehyde may also be used.

It is also preferable that the impregnating solution contains glucose, added in the dissolved state, at a solution density of about 1.1 gram per cm$^3$ in a proportion of up to 0.25 cm$^3$ per 1 g of the nickel salt. Rather than the addition of glucose, a higher alcohol may also be used.

In the preferred form of the process, the impregnating solution will also contain a small amount of a cobalt salt, preferably 2.5 to 10 parts by weight of cobalt salt per 100 parts by weight of nickel salt.

In addition to the method described above, favorable results may also be obtained when, prior to impregnation with the impregnating solution, the supporting grid is pre-impregnated with an aluminum salt solution.

Several examples of nickel electrodes prepared according to the invention and tested on a laboratory scale, demonstrating the excellent results obtained by the method according to the present invention, are described below. In each case, the impregnating and pre-impregnating immersions were for periods of approximately five (5) minutes, with about the same time period between immersions. Then each grid was immersed in an alkaline medium for about 30 minutes.

EXAMPLE 1

A porous, electrically conductive, supporting grid consisting of a rectangular, 2 mm. thick plate of nickel sponge, produced by the DAUG Co. of Esslingen, West Germany, with a cross-sectional area of 5 cm$^2$ and a weight of 1.2 g in the dry state, was pre-impregnated with a solution of aluminum salt for about 5 minutes. The solution consisted of aluminum nitrate (Al(NO$_3$)$_3$.9H$_2$O) in distilled water with a density of 1.153 g/cm$^3$ at about 50° to 60° C. Thereupon the supporting grid was immersed in the actual impregnating solution. This solution consisted of 5 g of nickel nitrate (Ni(NO$_3$)$_2$.6H$_2$O) dissolved in 2 cm$^3$ of acetone, 2.5 cm$^3$ of a solution of aluminum chloride (AlCl$_3$) in distilled water with a density of 1.275 g/cm$^3$, and 0.2 cm$^3$ of a solution of glucose in distilled water with a density of 1.075 g/cm$^3$. The impregnation was carried out at 50° to 60° C. for 5 minutes, and was repeated several times, with 5 minute pauses between impregnations. The weight of the supporting grid was approximately 2.0 g after the first impregnation, increased to 2.13 g after the second impregnation, however only marginally increased, to 2.14 and 2.17 g, after the third and fourth impregnations, respectively.

The electrode, within 30 minutes after the last impregnation, was then immersed for about 30 minutes in an alkaline medium, e.g., an aqueous solution of potassium hydroxide or sodium hydroxide and/or lithium hydroxide at a temperature ranging between 40° and 80° C., in order to precipitate the hydroxides. After precipitation, the electrode weighed 2.38 g in the wet state and, upon a one-hour discharge, had a specific ampere-hour capacity of 110 Ah/kg (ampere-hours per kilogram).

EXAMPLE 2

The supporting grid consisted of nickel sponge and had a cross-sectional area of 4.37 cm$^2$ and a weight of 1.11 g in the dry state. The grid was pre-impregnated with an aluminum nitrate solution having a density of 1.153 g/cm$^3$. The impregnating solution consisted of 5 g of nickel nitrate and 0.25 g of cobalt nitrate (Co(NO$_3$)$_2$.6H$_2$O), which were dissolved in 2 cm$^3$ of acetone. The solution also contained 2.5 cm$^3$ of an aluminum chloride solution with a density of 1.275 g/cm$^3$ and 0.2 cm$^3$ of glucose solution with a density of 1.075 g/cm$^3$. The grid was immersed in the impregnating solution four times, the solution at about 50° to 60° C., after which the electrode weighed 2.1 g. It was again noted that after the third and fourth impregnations the weight rose only by an insignificant amount. After precipitation of the hydroxides in a solution of potassium hydroxide and lithium hydroxide, the electrode weighed 2.17 g, and upon a one-hour discharge showed a specific ampere-hour capacity of 111 Ah/kg.

EXAMPLE 3

The grid consisted of nickel sponge, with a cross-sectional area of 4.37 cm$^2$ and a weight of 1.11 g. The supporting grid was pre-impregnated with an aluminum nitrate solution having a density of 1.153 g/cm$^3$, and then impregnated with an impregnating solution consisting of 5 g of nickel nitrate and 0.25 g of cobalt nitrate dissolved in 2 cm$^3$ of acetone, and 1.5 cm$^3$ of aluminum chloride solution with a density of 1.275 g/cm$^3$. After two impregnations at 50° to 60° C., the electrode weighed 2.01 g and, after precipitation of the hydroxides in potassium hydroxide, weighed 2.1 g. Upon a one-hour discharge, the electrode exhibited a specific ampere-hour capacity of 91 Ah/kg.

EXAMPLE 4

The supporting grid consisted of nickel sponge and had a cross-sectional area of 4.6 cm$^2$, with a weight of 1.185 g. This grid was not pre-impregnated, but directly immersed in an impregnating solution, which consisted of 5 g of nickel nitrate and 0.25 g of cobalt nitrate dissolved in 2 cm$^3$ acetone. The impregnating solution also contained 1.5 cm$^3$ of aluminum chloride solution with a density of 1.275 g/cm$^3$, 0.5 cm$^3$ of aluminum nitrate solution with a density of 1.153 g/cm$^3$, and 0.2 cm$^3$ of glucose solution with a density of 1.075 g/cm$^3$. The grid was impregnated twice in the solution, and weighed 2.2 g. After precipitation of the hydroxides through immersion in potassium hydroxide, the grid weighed 2.32 g. The specific ampere-hour capacity exhibited by this electrode was then 105 Ah/kg.

EXAMPLE 5

The grid plate consisted of nickel sponge having a cross-sectional area of 3.75 cm$^2$ and a weight of 0.925 g. The grid was pre-impregnated with an aluminum nitrate solution having a density of 1.153 g/cm$^3$. The main impregnating solution contained 5 g of nickel chloride (NiCl$_2$.6H$_2$O) and 0.25 g of cobalt nitrate dissolved in 2 cm$^3$ of acetone. The solution also contained 2.5 cm$^3$ of aluminum nitrate solution with a density of 1.252 g/cm$^3$ and 0.2 cm$^3$ of a glucose solution with a density of 1.075 g/cm$^3$. After two impregnations of the supporting grid, the electrode weighed 1.73 g in the wet state, and 1.79 g after precipitation of the hydroxides in potassium hydroxide. Upon an 0.7 hour discharge, this positive nickel electrode had a specific ampere-hour capacity of 80 Ah/kg.

In determining the ampere-hour capacities in each of the foregoing examples, the positive nickel electrode was assembled with a known negative electrode, e.g., nickel cobalt electrodes, in a storage battery cell. To date, all have been subjected to over 1000 cycles of one-hour discharges and 1.3 hour charges without the appearance of any change compared with the initial state. This fact, together with the very high specific ampere-hour capacities attained at favorable voltage settings, as well as the simple and time-, cost-, and energy-saving mode of preparation, demonstrates the outstanding suitability of such positive nickel electrodes for use in efficient alkaline storage batteries of long service life.

The processes described above are merely exemplary to demonstrate the preferred methods of forming a positive nickel electrode according to the present invention. Various modifications and substitutions will be apparent to those skilled in the art, and all such variations and substitutions are intended to be within the scope of the invention, as contained in the following claims.

I claim:

1. In a process for the production of a positive nickel electrode for alkaline storage batteries wherein a porous supporting grid of conducting material is immersed in an impregnating solution containing a nickel salt dissolved in a solvent, and said grid is subsequently immersed in an alkaline medium for precipitating out hydroxides, the improvement wherein said impregnating solution contains a least one aluminum salt in solution and wherein prior to impregnation with the impregnating solution, the supporting grid is immersed in a pre-impregnating solution comprising an aluminum salt solution.

2. A process according to claim 1, wherein the aluminum salt comprises aluminum chloride.

3. A process according to claim 1, wherein the aluminum salt comprises aluminum nitrate.

4. A process according to claim 1, 2, or 3, wherein the aluminum salt solution has a density of approximately 1.2 g/cm$^3$, and is added in an amount up to 1 cm$^3$ per 1 g of the nickel salt.

5. A process according to claim 1, 2, or 3, wherein the aluminum salt solution has a density of approximately 1.2 g/cm$^3$, and is added in an amount between 0.35 and 0.7 cm$^3$ per 1 g of the nickel salt.

6. A process according to claim 1, wherein said solvent has a low surface tension.

7. A process according to claim 6, wherein said solvent is acetone.

8. A process according to claim 6, wherein said solvent is ethanol.

9. A process according to claim 1, wherein said impregnating solution comprises glucose.

10. A process according to claim 9, wherein said glucose solution has a density of about 1.1 g/cm$^3$, and is added in an amount up to 0.25 cm$^3$ per 1 g of the nickel salt.

11. A process according to claim 1, wherein said impregnating solution contains a higher alcohol.

12. A process according to claim 1, wherein said impregnating solution contains a small amount of a cobalt salt.

13. A process according to claim 12, wherein said impregnating solution contains between 2.5 and 10 parts by weight cobalt salt per 100 parts by weight nickel salt.

14. A process according to claim 1, wherein said solvent has a low surface tension, and said impregnating solution further comprises glucose, a higher alcohol, and a small amount of a cobalt salt.

* * * * *